US012796589B2

(12) United States Patent
Puls et al.

(10) Patent No.: US 12,796,589 B2
(45) Date of Patent: Nov. 17, 2026

(54) SELF-PROPELLED OUTDOOR TOOL BASES AND ASSEMBLIES

(71) Applicant: Milwaukee Electric Tool Corporation, Brookfield, WI (US)

(72) Inventors: Kevin S. Puls, Milwaukee, WI (US); Beth E. Cholst, Wauwatosa, WI (US); Ryan D. Schwoegler, Brookfield, WI (US); Anthony J. Buxton, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 377 days.

(21) Appl. No.: 18/321,172

(22) Filed: May 22, 2023

(65) Prior Publication Data

US 2023/0389466 A1 Dec. 7, 2023

Related U.S. Application Data

(60) Provisional application No. 63/349,237, filed on Jun. 6, 2022.

(51) Int. Cl.
*A01C 17/00* (2006.01)
*B60L 50/60* (2019.01)

(52) U.S. Cl.
CPC .......... *A01C 17/005* (2013.01); *A01C 17/001* (2013.01); *B60L 50/60* (2019.02)

(58) Field of Classification Search
CPC ...... A01C 17/001; A01C 17/005; B60L 50/60
USPC .................................................. 239/681–687
See application file for complete search history.

(56) References Cited

U.S. PATENT DOCUMENTS

| | | | | | |
|---|---|---|---|---|---|
| 3,383,055 | A * | 5/1968 | Speicher | A01C 17/006 239/687 |
| 4,234,131 | A * | 11/1980 | Baker | A01C 17/005 239/685 |
| 5,333,795 | A | 8/1994 | Jessen | |
| 6,142,397 | A * | 11/2000 | Clay | A01C 15/02 239/687 |
| 7,837,073 | B2 * | 11/2010 | Havlovitz | A01C 15/02 239/681 |
| 10,779,464 | B1 * | 9/2020 | Falconer | A01C 17/001 |
| 2019/0116724 | A1 * | 4/2019 | Lefebvre | A01C 17/001 |

FOREIGN PATENT DOCUMENTS

| | | | |
|---|---|---|---|
| WO | WO2012091474 | A2 | 7/2012 |
| WO | WO2020219084 | A1 | 10/2020 |

* cited by examiner

*Primary Examiner* — Steven J Ganey
(74) *Attorney, Agent, or Firm* — Dority & Manning, P.A.

(57) ABSTRACT

Self-propelled outdoor tool bases and assemblies are provided. A self-propelled outdoor tool assembly includes one or more tools and a drive system. A tool may be a transportation tool such as a spreader hopper. An assembly may include a base, and the tool may be removably connectable to the base. The assembly may include a toolless connection between the tool and the base.

10 Claims, 5 Drawing Sheets

SELF-PROPELLED OUTDOOR TOOL BASES AND ASSEMBLIES

CROSS-REFERENCE TO RELATED APPLICATIONS

The present application claims priority to U.S. Provisional Patent Application No. 63/349,237 filed on Jun. 6, 2022, the disclosure of which is incorporated by reference herein in its entirety.

FIELD

The present disclosure relates generally to outdoor transportation tools, such as spreaders, wheelbarrows, packout storage boxes, etc., and more particularly to self-propelled bases for such transportation tools.

BACKGROUND

The transportation of materials in an outdoor environment is of significant importance, in particular to homeowners. For example, material spreaders are utilized to carry and facilitate spreading of fertilizer, pesticides, seeds, etc. Wheelbarrows and packout storage boxes are utilized to transport materials and tools. One issue with such transportation tools is that they must be manually pushed or hauled by the user.

Accordingly, improved transportation tools and assemblies are desired in the art. In particular, bases and assemblies which address known issues with such transportation tools would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a self-propelled outdoor tool assembly is provided. The self-propelled outdoor tool assembly includes one or more tools and a drive system.

In some embodiments, a tool may be a transportation tool such as a spreader hopper.

In some embodiments, an assembly may include a base, and the tool may be removably connectable to the base.

In some embodiments, the assembly may include a toolless connection between the tool and the base.

In accordance with one embodiment, a self-propelled outdoor tool assembly is provided. The assembly includes a spreader hopper defining an opening; a broadcasting component; a moveable shutter; and a drive system.

In accordance with one embodiment, a self-propelled outdoor tool assembly is provided. The assembly includes a spreader hopper defining an opening; a moveable shutter, the moveable shutter moveable to selectively provide access through the opening; a rotatable broadcasting component; a plurality of wheels; and a drive system, the drive system comprising a motor and a transmission, wherein the drive system transmits power from the motor to the plurality of wheels.

In accordance with one embodiment, a self-propelled outdoor tool assembly is provided. The assembly includes a transportation tool; and a drive system.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
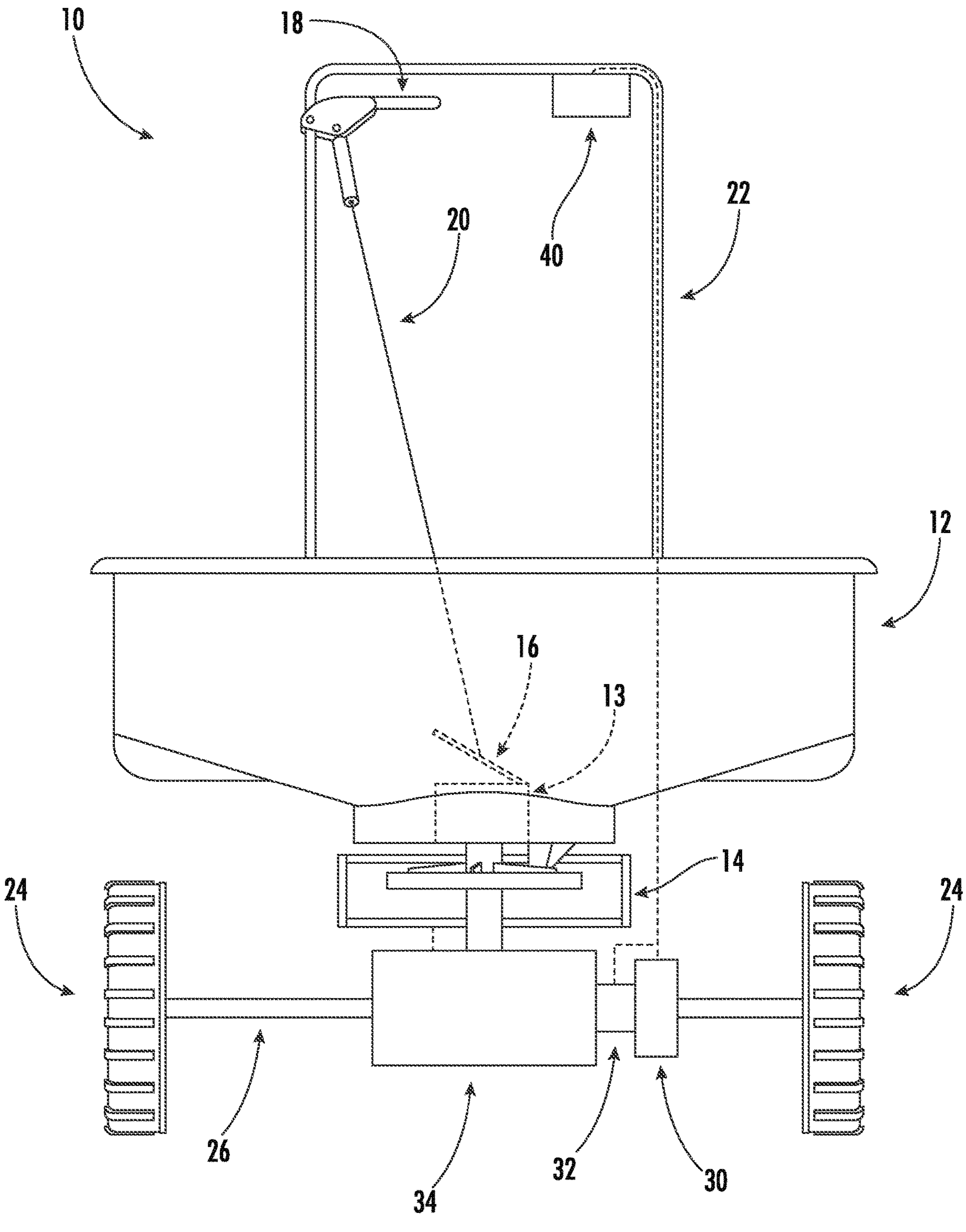
FIG. 1 provides a front view of an outdoor tool assembly in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, the present disclosure is directed to improved outdoor tool assemblies and bases therefor. In some embodiments, the outdoor tool may be a transportation tool such as a spreader, wheelbarrow, or packout storage box. In other embodiments, the outdoor tool may be another suitable tool such as a lawnmower, etc. Still further, in some embodiments, the outdoor tool may be a portion of the assembly. For example, an outdoor tool assembly may include a base and an outdoor tool removably connectable to the base. In some embodiments, a toolless connection may be provided between the base and outdoor tool, facilitating quick and efficient mounting and removal of the outdoor tool to the base. In some embodiments, multiple outdoor tools may be interchangeably mounted to and removed from a base in the outdoor tool assembly.

In exemplary embodiments, the assembly and/or base thereof may be self-propelled. The assembly and/or base may thus include a power supply (such as in exemplary embodiments a battery) and a motor, and may further include a transmission. The motor may be powered by the power supply, and may provide power to the transmission, which in turn may transmit such power to wheels of the assembly and/or base thereof. In some exemplary embodiments, the transmission may include a clutch, such as a centrifugal clutch or other suitable clutch.

Referring now to FIG. 1, one embodiment of an outdoor tool assembly 10 is provided. The assembly 10 includes an outdoor tool 12. In some embodiments, the tool 12 may be a transportation tool. For example, the tool 12 may be a spreader, such as the hopper thereof. In other embodiments, the tool 12 may be a wheelbarrow or packout storage box, such as the container thereof. In still other embodiments, the the tool 12 may be another suitable non-transportation tool, as a lawnmower.

As discussed, in some embodiments, the tool 12 may be a spreader, such as the hopper thereof. In these embodiments, the assembly 10 may further include an impeller or other suitable broadcasting component 14. An opening 15 may be defined in the hopper through which material in the hopper can flow to the broadcasting component 14. A moveable shutter 16 may be moveable to selectively provide access through the opening 15.

A user may be able to selectively move the shutter. For example, a trigger 18 may be connected to the shutter 16 via a wire 20, and the user may pull the trigger 18 to open the shutter 16. Alternatively, other suitable apparatus may be utilized to open and close the shutter 16. In some embodiments, such opening and closing may be manual, while in others, it may be automatic. For example, in some embodiments, the shutter may automatically open when the assembly 10 moves, and may automatically close when the assembly 10 movement stops.

The broadcasting component 14 may be rotatable, such as about a central axis thereof. In some embodiments, the broadcasting component 14 may rotate when the assembly 10 moves, and may stop rotation when the assembly 10 movement stops. For example, a transmission 34 of the assembly 10 may be connected to the broadcasting component 14 to cause such selective rotation.

The assembly 10 may further include a handle 22 and one or more wheels 24. In exemplary embodiments, assembly 10 may include a plurality of wheels 24, such as in some embodiments two wheels 24. In exemplary embodiments, wheels 24 may be connected to a common shaft assembly 26, which may include one, two, or more shaft components. Shaft assembly 26 may be rotatable about a longitudinal axis thereof, in turn causing rotation of the wheels 24.

As discussed, in exemplary embodiments, the assembly 10 is self-propelled, such that manual pushing of the assembly 10 by a user is not necessary for the assembly 10 to move. For example, in some embodiments, the assembly 10 may include a power supply 30 and a motor 32, and may further include a transmission 34. In exemplary embodiments, the power supply 30 is a battery, although in alternative embodiments the power supply may be a wired electrical connection, a fuel supply, or another suitable power supply. Power supply 30 may supply power to the motor 32, which in turn may operate to propel the assembly 10. For example, the shaft assembly 26 may be driven and thus rotated by the motor 32, such that the wheels 24 turn, causing movement of the assembly 10.

In some embodiments, motor 32 may directly drive the shaft assembly 26, such that force generated by the motor 32 is transmitted directly from the motor 32 to the shaft assembly 26. Alternatively, a transmission 34 may be provided between the motor 32 and the shaft assembly 26, and force generated by the motor 32 may be transmitted from the motor 32 through the transmission 34 to the shaft assembly 26. In exemplary embodiments, the transmission 34 includes one or more gears and/or clutches as discussed herein.

Assembly 10 may further include a user interface 40. User interface 40 may be or include a trigger, switch, button, graphical user interface, or other suitable interface for a user to activate the assembly 10. User interface 40 may, for example, be in communication with the power supply 30 and/or motor 32. Operation of the user interface 40 by the user may, for example, cause activation of the power supply 30 and/or motor 32 to operate the assembly as discussed herein.

Figure 2:
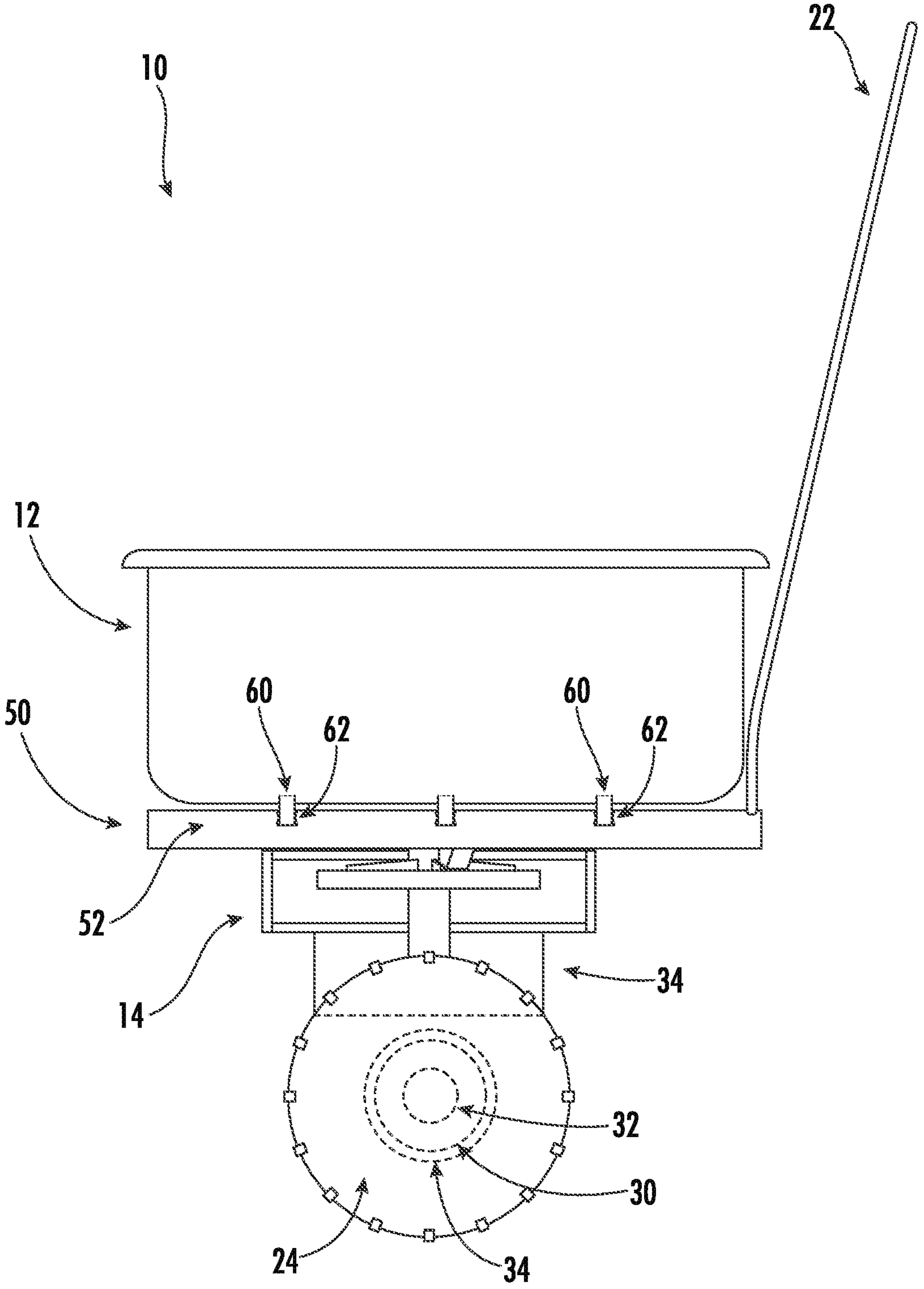
FIG. 2 provides a side view of an outdoor tool assembly in accordance with embodiments of the present disclosure.

Referring now to FIG. 2, as discussed, in some embodiments, tool 12 may be removably connectable from the assembly 10. In these embodiments assembly 10 may include one or more tools 12 and a base 50. Base 50 may include other components of the assembly 10, such as the handle 22, wheels 24, shaft assembly 26, power supply 30, motor 32, user interface 40, transmission 34, and/or drive system 116. Base may further include a frame 52 on which the various other base components 50 may be mounted.

In some embodiments, such as wherein a tool 12 is a spreader, such tool 12 may include a broadcasting component 14, opening 15, and shutter 16. Base 50 may include, for example, trigger 18 and wire 20, which may be removably connected to the tool 12 when the tool 12 is removably connected to the base 50.

In these embodiments, each tool 12 may be removably connected to the base 50. For example, in exemplary embodiments, a toolless connection may be provided between the base 50 and each tool 12. Each tool 12 may thus include one or more connection features 60, and base 50 may include one or more mating connection features 62. Connection features 60, 62 may be mating snap components, mating depressions and protrusions, mating clip components, etc. A tool 12 may be easily and efficiently connected to the base 50 by mating the connecting features 60, 62 together, and may be easily and efficiently removed from the base 50 by de-mating the connecting features 60, 62. In some embodiments, multiple tools 12 may be interchangeably mounted to and removed from a base 50 in the outdoor tool assembly 10. In some embodiments, each tool 12 may be different from others of the plurality of tools 12 in the assembly 10.

Figure 3:
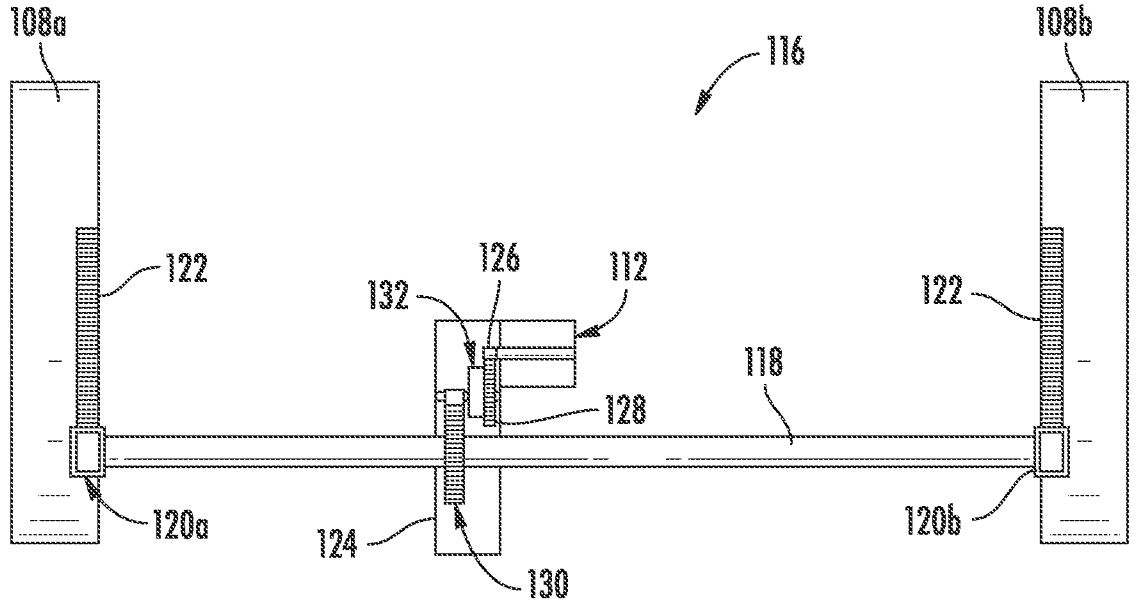
FIG. 3 is a schematic view of a drive system of the assembly in accordance with embodiments of the present disclosure.

FIG. 3 illustrates a schematic view of an exemplary drive system 116 which may be utilized with an assembly 10. The drive system 116 may include a motor 112 which may be utilized as motor 32 as discussed above, and may include a transmission 124 which may be utilized as transmission 34 as discussed above. Drive system 116 may transmit power from the motor 112 to opposite wheels 108*a* and 108*b*. The wheels 108*a* and 108*b* can be, for example, left and right rear wheels 24 of the assembly 10. The wheels 108*a* and 108*b* can be interfaced with an axle 118 (which can be shaft assembly 26 of assembly 10) through gears 120*a* and 120*b*. The gears 120*a* and 120*b* can interface with a wheel gear 122 of each one of the wheels 108*a* and 108*b*. Thus, as the axle 118 rotates, the wheels 108*a* and 108*b* can be driven by the gears 120*a* and 120*b* through the wheel gears 122.

In one embodiment, the gears 120*a* and 120*b* can be uni-directional gears, e.g., sprag gears, which enable the operator to overrun the assembly 10. Overrun is a condition whereby the speed of the assembly 10 exceeds a drive speed propelled by the motor 112. For instance, by way of non-limiting example, the motor 112 may be operating at 3 miles per hour. When the operator pushes the assembly 10 to increase speed past the operating speed of 3 miles per hour, the gears 120*a* and 120*b* can allow the assembly 10 to overrun whereby the operator can affect a higher operational speed. The uni-directional gearing may also enable the operator to turn the assembly 10 without requiring adjustment of the operating speed or any internal gearing.

The assembly 10 can further include a transmission 124 which converts power from an output 126 of the motor 112 to the axle 118. The transmission 124 can include, for instance, an input 128 in communication with the output 126 of the motor 112 and an output 130 in communication with the axle 118. A clutch mechanism 132 can be disposed between the input 128 and the output 130 for selectively transmitting power from the input 128 to the output 130. In some instances, the clutch mechanism 132 can be directly coupled with the output 126 of the motor 112. In such instances, the output 126 from the motor 112 can be referred to as the input.

When the motor 112 is operating at low speeds, i.e., below a low-speed threshold, the clutch mechanism 132 may be disengaged such that power from the motor 112 is not transmitted from the input 128 to the output 130. As the motor 112 increases speed, the clutch mechanism 132 may engage at, or around, the low-speed threshold to transmit power from the input 128 to the output 130. Power from the output 130 can then be transmitted to the wheels 108*a* and 108*b* through the axle 118 and gears 120*a* and 120*b*, respectively, to drive the wheels 108*a* and 108*b*.

Figure 4:
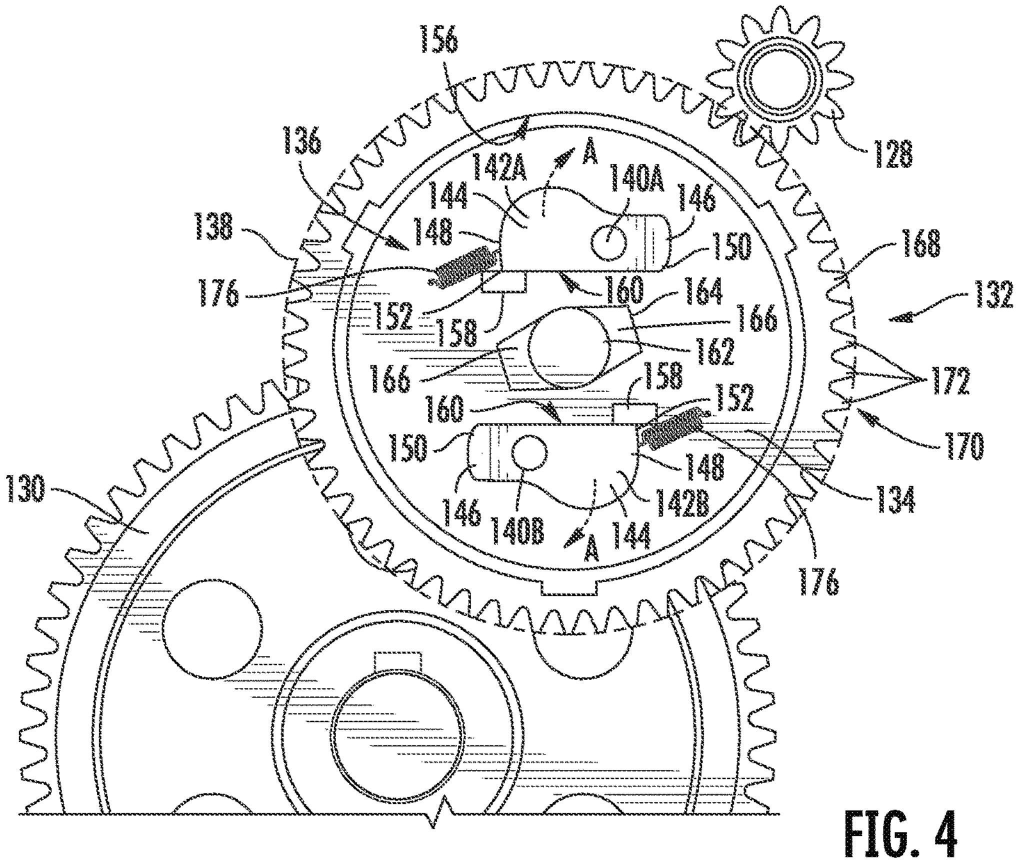
FIG. 4 is a simplified elevation view of a portion of a transmission of the drive system of the assembly as viewed in a disengaged position in accordance with embodiments of the present disclosure.
Figure 5:
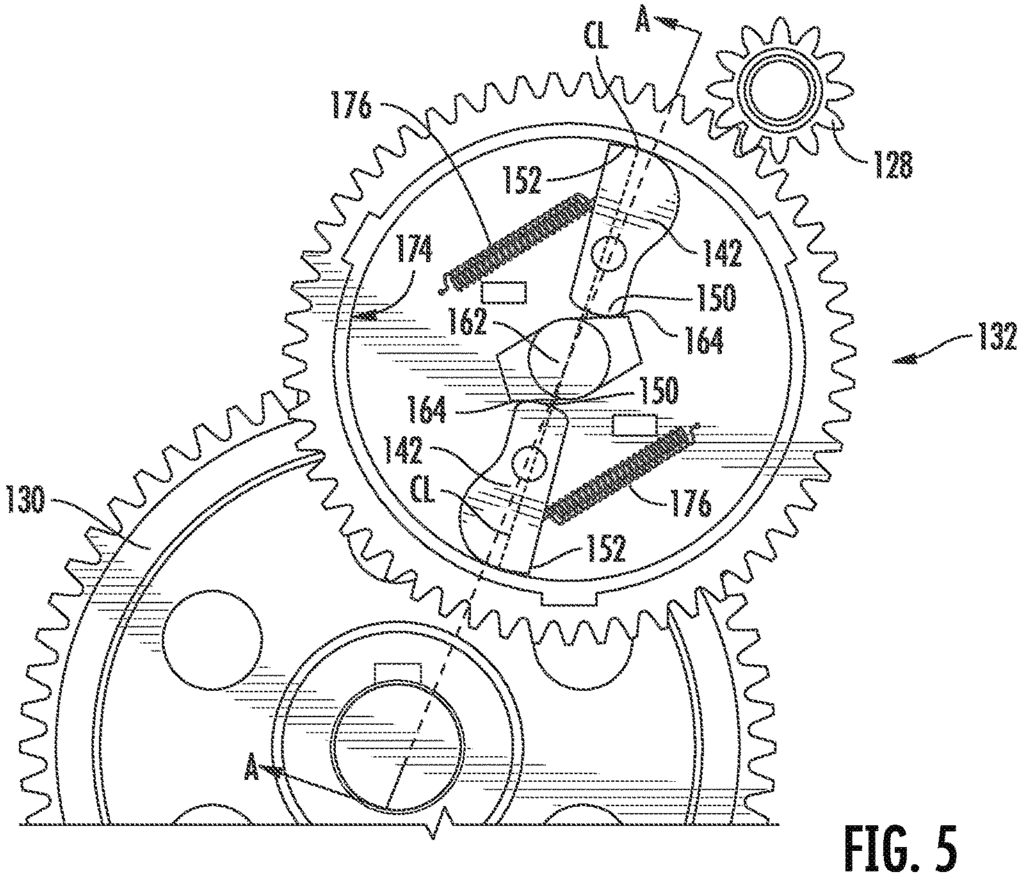
FIG. 5 is a simplified elevation view of a portion of the transmission of the drive system of the assembly as viewed in an engaged position in accordance with embodiments of the present disclosure.

FIGS. 4 and 5 illustrate one embodiment of the clutch mechanism 132, which as shown is a centrifugal clutch. FIG. 4 illustrates the clutch mechanism 132 in the disengaged position whereby the clutch mechanism 132 does not transmit power from the input 128 to the output 130. FIG. 5 illustrates the clutch mechanism 132 in the engaged position whereby the clutch mechanism 132 transmits power from the input 128 to the output 130.

Referring to FIG. 4, the clutch mechanism 132 generally includes a disk 134 having a major surface 136 and an outer perimeter 138. A first post 140A extends from the disk 134 in a direction generally perpendicular to the major surface 136. Similarly, a second post 140B extends from the disk 134 in a direction generally perpendicular to the major surface 136. The first and second posts 140A and 140B can be disposed at generally opposite sides of a central opening (not illustrated) of the disk 134. For instance, the first and second posts 140A and 140B can be spaced apart by 180°, or approximately 180° around the central opening of the disk 134. Centrifugal weights 142A and 142B can be coupled to the posts 140A and 140B, respectively. The centrifugal weights (collectively referred to by numeral 142) can be rotatable with respect to the posts (collectively referred to by numeral 140). As depicted in FIG. 4, the centrifugal weights 142 are each in the disengaged position. As the disk 134 begins to rotate, the centrifugal weights 142 can rotate about the posts 140 in a direction indicated by arrows A in FIG. 4. As described in greater detail below, the centrifugal weights 142 can thus move to the engaged position whereby the clutch mechanism 132 can transmit power to the output 130.

In an embodiment, the clutch mechanism 132 can be configured such that the centrifugal weights 142 rotate at least 5° as measured between the disengaged and engaged positions, such as at least 10° as measured between the disengaged and engaged positions, such as at least 15° as measured between the disengaged and engaged positions, such as at least 20° as measured between the disengaged and engaged positions, such as at least 25° as measured between the disengaged and engaged positions, such as at least 30° as measured between the disengaged and engaged positions, such as at least 35° as measured between the disengaged and engaged positions, such as at least 40° as measured between the disengaged and engaged positions. In a more particular embodiment, the clutch mechanism 132 can be configured such that the centrifugal weights 142 rotate at least 10° as measured between the disengaged and engaged positions, such as at least 20° as measured between the disengaged and engaged positions, such as at least 30° as measured between the disengaged and engaged positions, such as at least 45° as measured between the disengaged and engaged positions, such as at least 60° as measured between the disengaged and engaged positions, such as at least 90° as measured between the disengaged and engaged positions, such as at least 95° as measured between the disengaged and engaged positions.

Referring still to FIG. 4, the centrifugal weights 142 can share a common size. More particularly, the centrifugal weights 142 can have a common mass and a common moment of inertia. In this regard, the centrifugal weights 142 can rotate at the same, or approximately same, rotational speed of the disk 134. This can prevent wobble of the disk 134 which might otherwise occur under eccentric loading conditions. In instances with more than two centrifugal weights 142, it may be possible to vary one or more aspects of opposite pairs of centrifugal weights 142, e.g., two centrifugal weights 142 can have a first same shape while another two centrifugal weights 142 disposed between the two centrifugal weights 142 can have a second shape different from the first shape.

The centrifugal weights 142 can each generally include a body 144 defining a first end 146 and a second end 148. The first end 146 can include an engagement 150. By way of example, the engagement 150 can be a dog or other interface configured to interface with a central shaft 154 of the clutch mechanism 132. The second end 148 can include an engagement 152. The engagement 152 can be a dog or other interface configured to interface with an outer surface 156 of the disk 134 as described in greater detail below.

The disk 134 can include stops 158 which support the centrifugal weights 142 when the centrifugal weights 142 are in the disengaged position as illustrated in FIG. 4. In the illustrated embodiment, the stops 158 are blocks extending from the disk 134. In other embodiments, the stops 158 can include, e.g., pins, screws, springs, soft bumpers (e.g., rubber bumpers), or the like. The bodies 144 of each centrifugal weight 142 can include a stop surface 160 which rests against the stop 158. In one or more embodiments, at least one of the stops 158 can include a flat surface against which a flat stop surface 160 of the centrifugal weight 142 can be supported when the centrifugal weights 142 are in the disengaged position.

A central shaft 162 is disposed at a generally central location of the disk 134. In a particular embodiment, the central shaft 162 is coaxial with the disk 134. The central shaft 162 can extend through the central opening (not illustrated) in the disk 134 such that a portion of the central shaft 162 is on a first side of the disk 134 and another portion of the central shaft 162 is on a second, opposite side of the disk 134. The central shaft 162 can be rotatable with respect to the disk 134. In a particular embodiment, the disk 134 may rotate about the central shaft 162. In this regard, the central shaft 162 can form an axle upon which the disk 134 rotates.

The central shaft 162 can include one or more drive surfaces 164. In the illustrated embodiment, the central shaft 162 includes two drive surfaces 164 disposed on protrusions 166 extending from the central shaft 162 in a generally radial direction. In an embodiment, the protrusions 166 can prevent the disk 134 from sliding off the central shaft 162.

As previously described, the input 128 can receive driving power from the prime mover (e.g. motor) of the assembly 10. In the depicted embodiment, the input 128 is an input gear. The input gear can be coupled to a shaft and rotatable about a central axis. The input gear is rotated, e.g., counterclockwise, to rotatably drive the clutch mechanism 132, e.g., clockwise. The input gear can interface with the clutch mechanism 132 at an outer gear 168 of the disk 134. The outer gear 168 can be disposed at, or adjacent, the outer perimeter 138 of the disk 134. In an embodiment, the outer gear 168 can form at least a portion of the outer perimeter 138 of the disk 134. For example, a top land 170 of each tooth 172 of the outer gear 168 can form the outer perimeter 138 of the disk 134.

In some instances, the input 128 and disk 134 of the clutch mechanism 132 can be coplanar. That is, the input 128 and disk 134 can lie along a same plane. In other instances, the input 128 and disk 134 can lie along parallel offset planes. That is, the input 128 and disk 134 can be parallel with one another but lie along different planes. In yet other instances, the input 128 and disk 134 can lie along angularly offset planes. For instance, the input 128 and disk 134 can form a beveled gear interface angularly offset, e.g., by 90°, from one another.

At low operational speeds, e.g., below a low-speed threshold, the clutch mechanism 132 can appear as shown in FIG. 4. As the speed of the clutch mechanism 132 increases as a result of increased rotational speed of the disk 134, the centrifugal weights 142 can rotate about posts 140 as shown by arrow A. In certain instances, the clutch mechanism 132 can rotate in a range of rotational speeds whereby the centrifugal weights 142 are not supported by the stops 158 but the centrifugal weights 142 are also not in the engaged position. This may be referred to as an intermediate period where the centrifugal weights 142 are moving from the disengaged position to the engaged position. As the speed of rotation increases to the low-speed threshold, the centrifugal weights 142 can move to the engaged position as shown in FIG. 5.

FIG. 5 illustrates the clutch mechanism 132 with the centrifugal weights 142 in the engaged position whereby the clutch mechanism 132 can transmit power from the input 128 to the output 130. As depicted, the engagement 150 of each centrifugal weight 142 is in contact with a respective drive surface 164 of the central shaft 162 when the centrifugal weights 142 are in the engaged position. Moreover, the engagements 152 of each centrifugal weight 142 are interfaced with the disk 134, e.g., at an outer surface 174 of the clutch mechanism 132, such that further rotation of the centrifugal weights 142 about the posts 140 is prevented. In this state, each of the centrifugal weights 142 is compressed between the outer surface 174 of the clutch mechanism 132 and the drive surface 164 of the central shaft 162 such that each centrifugal weight 142 acts like a fixed power transmission member for transmitting power from the input 128 to the central shaft 162. Accordingly, the output 130 is rotatably driven by the clutch mechanism 132 in the engaged position as illustrated in FIG. 5.

The outer surface 174 of the clutch mechanism 132 is intended to refer to a surface of the clutch mechanism 132 disposed radially outside of the centrifugal weights 142 that maintains the centrifugal weights 142 in the engaged position. As the centrifugal weights 142 move to the outer surface 174, the engagement 150 can interface with the drive surface 164 of the central shaft 162. Without the outer surface 174, it is possible that the centrifugal weights 142 would continue to rotate about the posts 140 as caused, e.g., by resistance and inertia of the central shaft 162. That is, the outer surface 174 prevents over-rotation of the centrifugal weights 142.

In the illustrated embodiment, the outer surface 174 comprises a surface extending from the disk 134 in a direction perpendicular, or generally perpendicular, to the major surface 136 of the disk 134. The surface can extend continuously around the disk 134 or include, e.g., a plurality of surfaces against which the centrifugal weights 142 can interface. In one or more non-illustrated embodiments, the outer surface 174 can include a post, a screw, a spring, a bumper (e.g., a rubber bumper), or the like. In some instances, the outer surface 174 can have a same, or similar, construction as the stop 158, e.g., the outer surface 174 and stop 158 can be integral with the disk 134. In other instances, the outer surface 174 and stop 158 can have different constructions, e.g., the stop 158 can include a discrete (separate) component coupled with the disk 134 and the outer surface 174 can be integral with the disk 134.

In an embodiment, the centrifugal weights 142 can be disposed inside of the perimeter 138 (FIG. 4) when the centrifugal weights 142 are in the disengaged and engaged positions. That is, the centrifugal weights 142 may remain within the perimeter 138 of the disk 134 at all times during operation. In a more particular embodiment, all elements of the clutch mechanism 132 can remain within the outer perimeter 138 of the disk 134 at all times during operation. In this regard, the clutch mechanism 132 can be utilized in transmissions 124 without consideration for moving parts (e.g., the centrifugal weights 142) which might form a new outermost perimeter of the clutch mechanism 132 at certain operational speeds. That is, by maintaining all components of the clutch mechanism 132 within the same outer perimeter 138 at all times during operation, the clutch mechanism 132 can be treated more similarly to any other operating gears or elements of the transmission 124 without requiring special accommodation.

In an embodiment, the centrifugal weights 142 can each define a centerline CL. The centerlines CL of the centrifugal weights 142 can be angularly offset from one another by less than 45°, as measured when the centrifugal weights are in the engaged position, such as less than 30°, as measured when the centrifugal weights are in the engaged position, such as less than 15°, as measured when the centrifugal weights are in the engaged position. In the depicted embodiment, the centerlines CL of the centrifugal weights 142 are angularly offset from one another by less than 5°.

Figure 6:
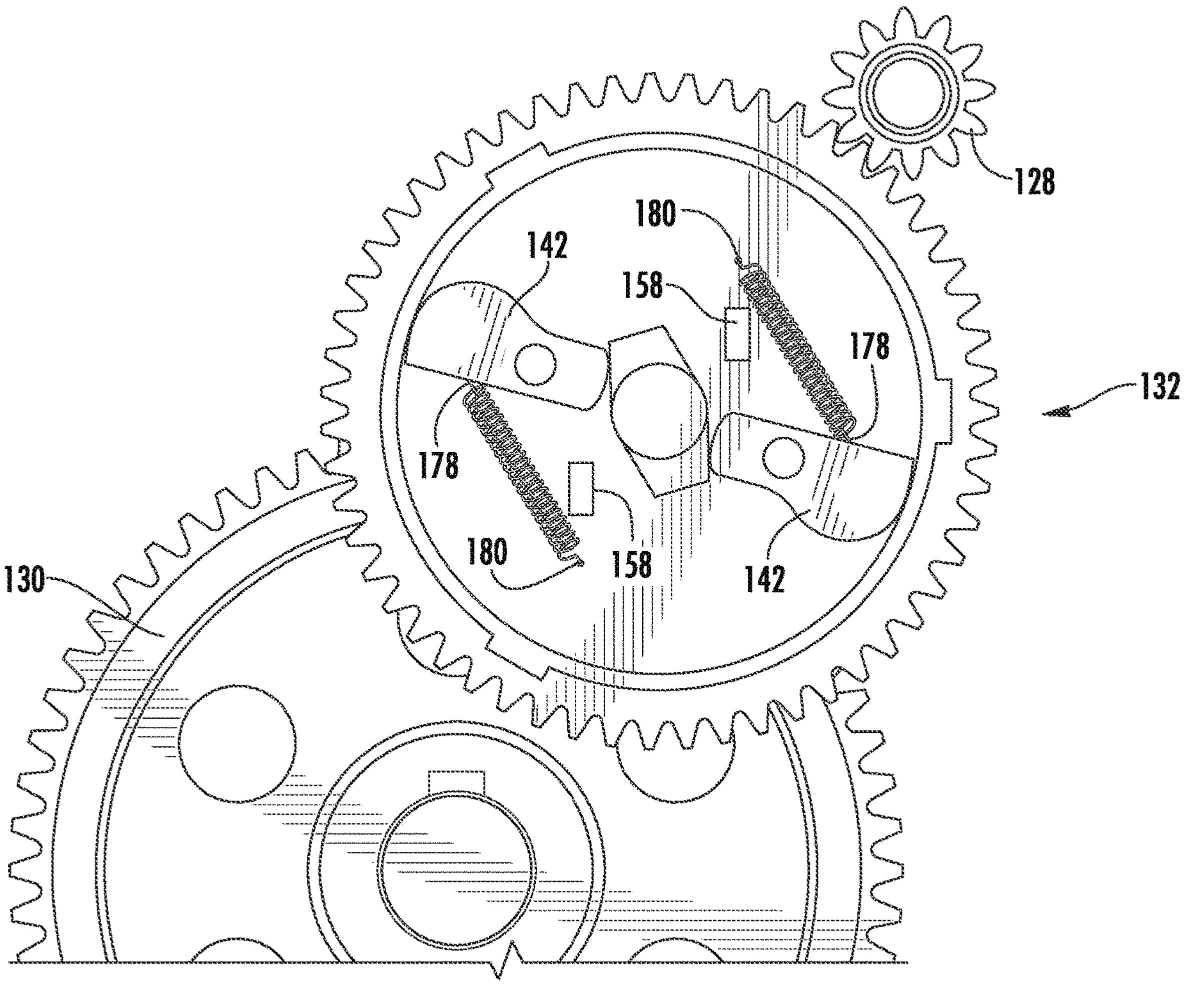
FIG. 6 is a simplified elevation view of a portion of the transmission of the drive system of the assembly as viewed in the engaged position in accordance with embodiments of the present disclosure.

FIG. 6 illustrates a view of the clutch mechanism 132 with the centrifugal weights 142 in the engaged position similar to FIG. 5, however, FIG. 6 depicts the clutch mechanism 132 after 90° of rotation, caused by rotation of the input 128. The centrifugal weights 142 can remain in the position illustrated in FIGS. 5 and 6 as the clutch mechanism 132 rotates, and more particularly as the clutch mechanism 132 rotates above the low-speed threshold. As the clutch mechanism 132 decreases speed below the low-speed threshold, the centrifugal weights 142 can move towards the stops 158. Under a certain rotational speed, the centrifugal weights 142 can return to rest against the stops 158 as depicted in FIG. 4.

To return the centrifugal weights 142 to the disengaged position, the clutch mechanism can include one or more urging elements, e.g., springs 176, which provide a force to the centrifugal weights 142 to return them to the disengaged position. In the depicted embodiment, the springs 176 have first ends 178 coupled to the centrifugal weights 142 and second ends 180 coupled to the disk 134. In other instances, the springs 176 may be connected between the centrifugal weights 142 and another portion of the clutch mechanism 132, such as the stops 158 or a separate spring attachment point. The springs 176 can be, e.g., coil springs which are selected to have a spring constant and size to affect disengagement of the centrifugal weights 142 at a desired low-speed threshold. For instance, springs 176 with lower spring constants may remain engaged at lower low-speed thresholds while springs 176 with higher spring constants may disengage at lower low-speed thresholds.

Further aspects of the invention are provided by one or more of the following embodiments:

A self-propelled outdoor tool assembly including one or more tools and a drive system.

A self-propelled outdoor tool assembly of any one or more of the embodiments described herein, wherein the tool is a transportation tool.

A self-propelled outdoor tool assembly of any one or more of the embodiments described herein, wherein the tool includes a spreader hopper.

A self-propelled outdoor tool assembly of any one or more of the embodiments described herein, wherein an opening is defined in the spreader hopper, and wherein the tool further comprises a broadcasting component and a moveable shutter.

A self-propelled outdoor tool assembly of any one or more of the embodiments described herein, further comprising a base, and wherein the tool is removably connectable to the base.

A self-propelled outdoor tool assembly of any one or more of the embodiments described herein, further comprising a toolless connection between the tool and the base.

A self-propelled outdoor tool assembly of any one or more of the embodiments described herein, further comprising a plurality of wheels, a shaft assembly, and a handle.

A self-propelled outdoor tool assembly of any one or more of the embodiments described herein, further comprising a power supply, and wherein the power supply is a battery.

A self-propelled outdoor tool assembly of any one or more of the embodiments described herein, wherein the drive system comprises a motor and a transmission.

A self-propelled outdoor tool assembly of any one or more of the embodiments described herein, wherein the transmission includes an input, an output, and a clutch.

A self-propelled outdoor tool assembly of any one or more of the embodiments described herein, wherein the clutch is a centrifugal clutch.

A self-propelled outdoor tool assembly including a spreader hopper defining an opening; a broadcasting component; a moveable shutter; and a drive system.

A self-propelled outdoor tool assembly of any one or more of the embodiments described herein, further comprising a base, and wherein the spreader hopper is removably connectable to the base.

A self-propelled outdoor tool assembly of any one or more of the embodiments described herein, further comprising a toolless connection between the spreader hopper and the base.

A self-propelled outdoor tool assembly of any one or more of the embodiments described herein, further comprising a plurality of wheels, a shaft assembly, and a handle.

A self-propelled outdoor tool assembly of any one or more of the embodiments described herein, further comprising a power supply, and wherein the power supply is a battery.

A self-propelled outdoor tool assembly of any one or more of the embodiments described herein, wherein the drive system comprises a motor and a transmission.

A self-propelled outdoor tool assembly of any one or more of the embodiments described herein, wherein the transmission includes an input, an output, and a clutch.

A self-propelled outdoor tool assembly of any one or more of the embodiments described herein, wherein the clutch is a centrifugal clutch.

A self-propelled outdoor tool assembly including a spreader hopper defining an opening; a moveable shutter, the moveable shutter moveable to selectively provide access through the opening; a rotatable broadcasting component; a plurality of wheels; and a drive system, the drive system comprising a motor and a transmission, wherein the drive system transmits power from the motor to the plurality of wheels.

A self-propelled outdoor tool assembly of any one or more of the embodiments described herein, further comprising a base, and wherein the spreader hopper is removably connectable to the base.

A self-propelled outdoor tool assembly of any one or more of the embodiments described herein, further comprising a toolless connection between the spreader hopper and the base.

A self-propelled outdoor tool assembly of any one or more of the embodiments described herein, further comprising a power supply, and wherein the power supply is a battery.

A self-propelled outdoor tool assembly including a transportation tool; and a drive system.

A self-propelled outdoor tool assembly of any one or more of the embodiments described herein, wherein the transportation tool comprises one of a spreader hopper, a wheelbarrow, or a packout storage box.

A self-propelled outdoor tool assembly of any one or more of the embodiments described herein, further comprising a base, and wherein the transportation tool is removably connectable to the base.

A self-propelled outdoor tool assembly of any one or more of the embodiments described herein, further comprising a toolless connection between the transportation tool and the base.

A self-propelled outdoor tool assembly of any one or more of the embodiments described herein, further comprising a power supply, and wherein the power supply is a battery.

A self-propelled outdoor tool assembly of any one or more of the embodiments described herein, wherein the drive system comprises a motor and a transmission.

A self-propelled outdoor tool assembly of any one or more of the embodiments described herein, wherein the transmission includes an input, an output, and a clutch.

A self-propelled outdoor tool assembly of any one or more of the embodiments described herein, wherein the clutch is a centrifugal clutch.

A self-propelled outdoor tool assembly of any one or more of the embodiments described herein, further comprising a user interface.

A self-propelled outdoor tool assembly in accordance with one or more embodiments as shown and described herein.

A base for a self-propelled outdoor tool assembly in accordance with one or more embodiments as shown and described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A self-propelled outdoor tool assembly, comprising:
- a spreader hopper defining an opening;
- a broadcasting component;
- a moveable shutter;
- a shaft assembly including an axle; and
- a drive system, the drive system comprising a motor and a transmission, wherein the transmission comprises an input coupled to the motor, an output coupled to the axle, and a clutch between the input and the output, wherein the clutch comprises:
  - a disk defining a central opening,
  - a central shaft extending through the central opening,
  - a first centrifugal weight rotatably coupled to the disk, and
  - a second centrifugal weight rotatably coupled to the disk, wherein the first centrifugal weigh and the second centrifugal weight are configured to rotate between a disengaged position and an engaged position, wherein disk is rotatable about the central shaft in the disengaged position, and wherein the first centrifugal weight and the second centrifugal weight engage a drive surface of the central shaft in the engaged position for transmitting power from the input to the central shaft.

2. The self-propelled outdoor tool assembly of claim 1, further comprising a base, and wherein the spreader hopper is removably connectable to the base.

3. The self-propelled outdoor tool assembly of claim 2, further comprising a toolless connection between the spreader hopper and the base.

4. The self-propelled outdoor tool assembly of claim 1, further comprising a plurality of wheels and a handle.

5. The self-propelled outdoor tool assembly of claim 1, further comprising a power supply, and wherein the power supply is a battery.

6. The self-propelled outdoor tool assembly of claim 1, wherein the clutch is a centrifugal clutch.

7. A self-propelled outdoor tool assembly, comprising:
- a spreader hopper defining an opening;
- a moveable shutter, the moveable shutter moveable to selectively provide access through the opening;
- a rotatable broadcasting component;
- a shaft assembly including an axle;
- a plurality of wheels coupled to the axle; and
- a drive system, the drive system comprising a motor and a transmission, wherein the drive system transmits power from the motor to the plurality of wheels, and wherein the transmission comprises an input coupled to the motor, an output coupled to the axle, and a clutch between the input and the output, wherein the clutch comprises:
  - a disk defining a central opening,
  - a central shaft extending through the central opening,
  - a first centrifugal weight rotatably coupled to the disk, and
  - a second centrifugal weight rotatably coupled to the disk, wherein the first centrifugal weigh and the second centrifugal weight are configured to rotate between a disengaged position and an engaged position, wherein disk is rotatable about the central shaft in the disengaged position, and wherein the first centrifugal weight and the second centrifugal weight engage a drive surface of the central shaft in the engaged position for transmitting power from the input to the central shaft.

8. The self-propelled outdoor tool assembly of claim 7, further comprising a base, and wherein the spreader hopper is removably connectable to the base.

9. The self-propelled outdoor tool assembly of claim 8, further comprising a toolless connection between the spreader hopper and the base.

10. The self-propelled outdoor tool assembly of claim 7, further comprising a power supply, and wherein the power supply is a battery.

* * * * *